United States Patent
Swaddle

(10) Patent No.: US 10,986,831 B2
(45) Date of Patent: Apr. 27, 2021

(54) SYSTEMS AND METHODS FOR REDUCING THE RISKS OF BIRD STRIKE

(71) Applicant: College of William & Mary, Williamsburg, VA (US)

(72) Inventor: John P. Swaddle, Williamsburg, VA (US)

(73) Assignee: College of William & Mary, Williamsburg, VA (US)

( * ) Notice: Subject to any disclaimer, the term of this patent is extended or adjusted under 35 U.S.C. 154(b) by 62 days.

(21) Appl. No.: 16/039,494

(22) Filed: Jul. 19, 2018

(65) Prior Publication Data

US 2019/0021303 A1    Jan. 24, 2019

Related U.S. Application Data

(60) Provisional application No. 62/536,040, filed on Jul. 24, 2017.

(51) Int. Cl.
| | | |
|---|---|---|
| *A01M 29/18* | (2011.01) | |
| *A01M 29/10* | (2011.01) | |
| *A01M 29/08* | (2011.01) | |

(52) U.S. Cl.
CPC ............ *A01M 29/18* (2013.01); *A01M 29/08* (2013.01); *A01M 29/10* (2013.01)

(58) Field of Classification Search
CPC ....... A01M 29/18; A01M 29/08; A01M 29/10
See application file for complete search history.

(56) References Cited

U.S. PATENT DOCUMENTS

| 4,736,907 A | 4/1988 | Steffen |
|---|---|---|
| 5,774,088 A | 6/1998 | Kreithen |
| 9,227,726 B2 | 1/2016 | Boren |
| 9,693,548 B2 | 7/2017 | Swaddle |
| 2013/0249218 A1* | 9/2013 | Vassilev ............... A01M 29/16 290/55 |
| 2014/0352631 A1* | 12/2014 | Swaddle ............... A01M 29/18 119/719 |
| 2017/0164603 A1* | 6/2017 | Kovarik ............... A01M 29/10 |

FOREIGN PATENT DOCUMENTS

| WO | 97/29633 A1 | 8/1997 |
|---|---|---|
| WO | 2010/023253 A1 | 3/2010 |

OTHER PUBLICATIONS

Nicholson et al., "Strategies for Prevention of Bird-Strike Events", Aero Quarterly (2011), QTR 03, pp. 17-25.
Martin, "Understanding bird collisions with man-made objects: a sensory ecology approach", The International Journal of Avian Science (2011), vol. 153, pp. 239-254.

* cited by examiner

*Primary Examiner* — Brian A Zimmerman
*Assistant Examiner* — Kevin Lau
(74) *Attorney, Agent, or Firm* — Jason P. McDevitt

(57) ABSTRACT

A combination of a visual warning cue and a conspicuous auditory warning cue acts synergistically to reduce bird strike frequency against a man-made structure. Methods and systems are described for providing said combination of warning cues when a bird is within a warning zone. The auditory warning cue entails at least two separate sonic pulses within one second when the bird is within the warning zone, and is defined by an intensity-weighted frequency average of between 6 kHz and 18 kHz, and an intensity at a location within the warning zone of at least 70 decibels.

2 Claims, 8 Drawing Sheets

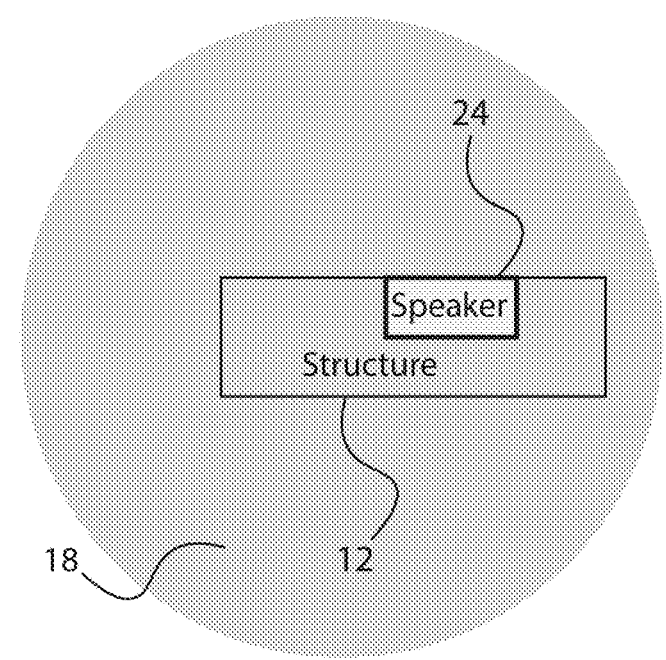
FIG. 4A
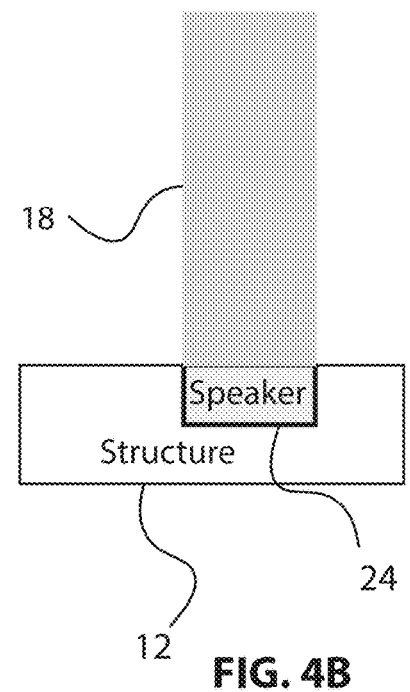
FIG. 4B
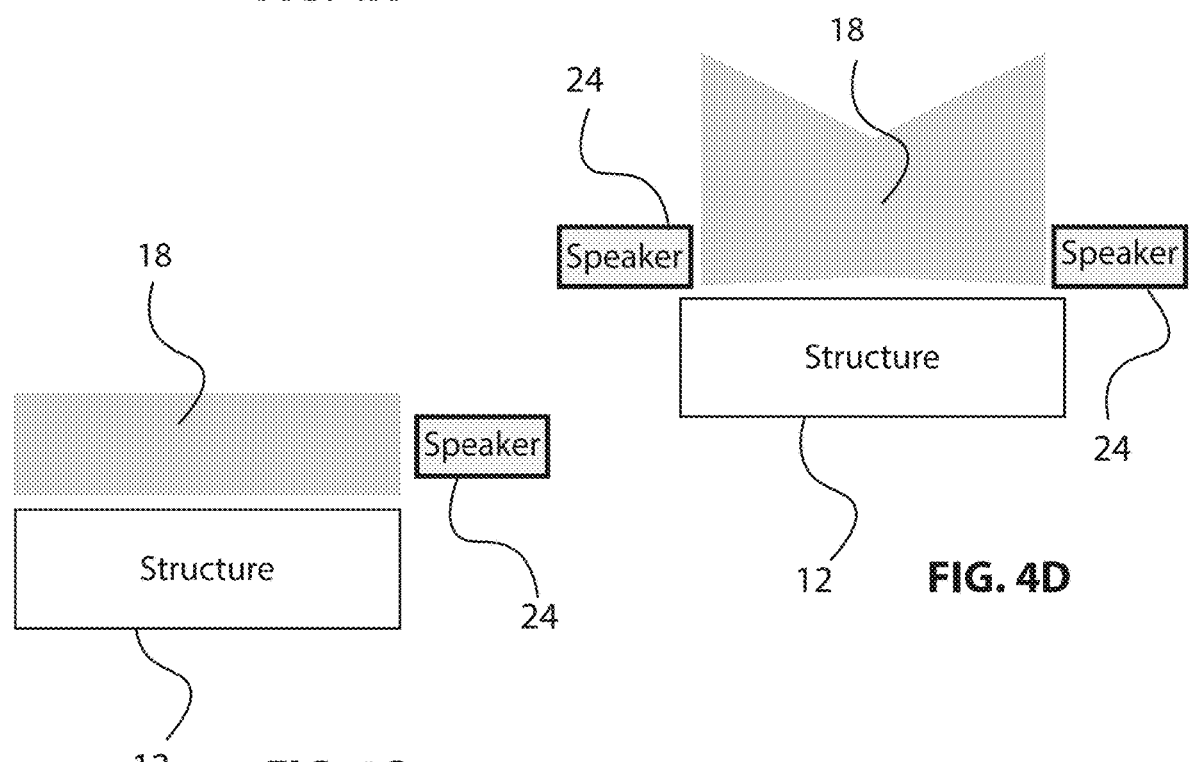
FIG. 4C
FIG. 4D

SYSTEMS AND METHODS FOR REDUCING THE RISKS OF BIRD STRIKE

CROSS-REFERENCE TO RELATED APPLICATIONS

The present application claims priority under 35 U.S.C. 119(e) to U.S. Provisional Patent Application No. 62/536,040, filed Jul. 24, 2017, the entire disclosure of which is incorporated by reference herein.

STATEMENT REGARDING FEDERALLY SPONSORED RESEARCH OR DEVELOPMENT

Not applicable

FIELD OF THE INVENTION

The invention relates generally to systems and methods for reducing undesirable bird strikes against structures such as windows, airplanes, communication towers, and wind turbines.

BACKGROUND OF THE INVENTION

Each year, billions of birds collide with large man-made structures including buildings, towers, airplanes, and turbines. These bird strikes cause significant economic damage and cause enormous mortality among many bird species. Many different mitigation strategies have been described, with varying amounts of success.

For example, in U.S. Pat. No. 9,693,548, Swaddle describes a sonic net system to deter birds from a given location. Boren (U.S. Pat. No. 9,227,726) describes a method for continuously discharging a persistent vapor of bird repellent from a flying aircraft into a runway flight path corridor to reduce bird strike. Numerous products are available to reduce bird strikes on windows, typically products that are adhered to the outside of a window to increase the visual perception of a barrier. Loud noises, pyrotechnics, and laser beams are used to drive birds away from airports. Speakers playing predator noises are used to reduce bird populations at orchards. Other auditory products broadcast bird distress signals. Scarecrows and bird kites have been used. Unmanned aerial vehicles have also been used.

Steffen (U.S. Pat. No. 4,736,907) teaches a method for reducing bird collisions with aircrafts by installing on an aircraft a light source that produces light flashes. The frequency of the light flashes produced is varied during at least one cycle time period.

Kreithen (U.S. Pat. No. 5,774,088) teaches a method to alert and warn birds of the presence of an aircraft or wind turbine by pulsing microwave energy in the frequency range of 1 GHz to about 40 GHz.

Butler (WO2010023253 A1) teaches a bird collision avoidance system that can be installed on an aircraft or wind turbines. The system includes a bird detection unit and a bird repelling unit, wherein the repelling unit comprises at least one sound emitter to generate a sound signal having a variable frequency, focused beam pattern which is directed along a projected flight path of the aircraft. The advantage of using sound signal having a focused beam pattern is that the beam can be focused substantially directly at a bird in the projected flight path of the aircraft and can be used to repel the bird away from the projected flight path of the aircraft. The sound beam frequency will vary from infrasound, below 50 Hz, increasing through frequencies primarily used by birds to detect a threat, commonly from 300 Hz to approximately 8 kHz, up to ultrasound frequencies greater than 20 kHz, which may carry a modulated audio signal.

WO1997029633A1 describes an apparatus for reducing the presence of birds in an area using random or pseudo-random sound of varying amplitude and frequency.

The Super QuadBlaster 4 Bird Repeller with Strobe Light (available from Birdstoppers.com, a division of Dean Lloyd Enterprises in Montgomery, Ill.) utilizes a combination of a flashing light and an ultrasound output with a range between 20 kHz and 30 kHz.

In general, these various systems have limitations, often because the birds habituate to them, or they are costly, or they are effective on only some species of birds, or their effect is only modest, or other reasons.

Aircraft collisions with birds cause a serious economic and safety problem. On a worldwide basis, direct and indirect costs to the civil aviation industry owing to bird strikes exceed $1.2 billion annually. In 2011, of the 10,083 wildlife strikes that were reported in the United States, 97.1 percent thereof involved birds. The annual cost of these strikes was estimated to be $718 million in direct and indirect losses. To make matters worse, airport locales frequently attract some bird species because of the presence of resources such as food and nesting sites.

Animals are also adversely impacted and suffer from stress and increased mortality around areas of human habitation, buildings, agriculture and infrastructure. For example, in the United States alone, approximately one billion birds are killed each year by flying into buildings, cell towers, wind turbines, and other man-made structures. Some animals are intentionally killed by humans because of encroachment into areas of human habitation and agriculture.

SUMMARY OF THE INVENTION

Herein, we provide a system and method for reducing undesirable bird strikes on a selected structure comprising combining a visual warning cue and an auditory warning cue (also referred to, for example, as a sonic cue) to attract the attention of a bird and thereby give the bird enhanced opportunity to avoid a collision with the structure. A combination of a visual cue and a conspicuous auditory cue provides synergistic benefits, meaning that the increased likelihood of a bird's avoiding a strike when exposed to this combination of visual and auditory cues is greater than the sum of the increased likelihood of strike avoidance from either cue presented separately. Unlike typical prior art sound-making devices that are designed to scare birds, deter birds, annoy birds, or prevent interspecies communication, the systems and methods described herein are designed to reduce bird-strike by alerting birds to induce them to become more aware of impending threats. In particular, the intensity of the auditory warning cue is not consistent over time: not only is the intensity not constant, but the pulse pattern is not constant either.

The selected structure (i.e., the structure that one hopes to reduce bird strikes upon) itself provides a visual cue, which can be optionally enhanced using, for example, colors, light, or texture designs to attract visual attention.

A warning zone exists wherein a bird can see the visual warning cue and hear the auditory warning cue, and, if properly alerted, can take evasive action to avoid a collision with the structure. At any point in the warning zone, a bird has a direct line of sight to the selected structure. At any point in the warning zone, the maximum intensity of the auditory warning cue is at least 70 decibels. The peak decibel intensity of the auditory warning cue is between 6 kHz and 18 kHz. The auditory warning cue comprises at least two distinct sonic pulses emitted within one second, each of said sonic pulses having a peak decibel intensity at a frequency of between 6 kHz and 18 kHz, and each of said sonic pulses providing a maximum decibel intensity within the warning zone of at least 70 decibels. A sonic pulse is defined herein to end when either (i) the decibel level (defined as the maximum decibel level at any frequency) drops by at least 10 dB from the maximum intensity of the sonic pulse, or (ii) the frequency corresponding to the maximum decibel intensity (i.e., the peak frequency) shifts by more than 500 Hz. In some embodiments, the sonic pulses have different temporal periodicity.

Some structures inherently produce some sort of sound cue, (e.g., a spinning wind turbine), but the specific auditory cue contemplated herein which provides enhanced warning benefits to birds comprises at least two distinct, loud, and relatively high-frequency sounds having different temporal periodicity emitted within one second. More specifically, the desired auditory warning cue is in the sound range 6 kHz to 18 KHz, or 8 kHz to 18 kHz, or 6 kHz to 14 kHz, or 8 kHz to 14 kHz, or ranges incorporating any of the foregoing values. The frequencies cited refer to the frequency at which the peak intensity (as measured in decibels) occurs, also referred to as the peak frequency of the sound. These frequency ranges are outside of the typical range of sounds that constitutes background noise, and thus are more likely to grab a bird's attention, particularly when presented in conjunction with a visual cue. The auditory warning cue is designed to be both unusual and conspicuous to the birds.

In some embodiments, the audio cue is presented via a speaker attached to the structure. In other embodiments, the speaker is attached to an object separate from the structure. In some embodiments, a directional speaker is employed to project sound in a defined pattern, which, for example, may offer an increasing gradient of sound amplitude as the birds approach the strike object. The sound can be produced by any sound-producing system, including those known in the art.

In some embodiments, a bird detector unit is employed which detects the presence of birds in or near the warning zone, and the system can be configured such that the auditory warning cue is only emitted when at least one bird is detected within a selected region within or near to the warning zone.

Accordingly, it is an object of the present invention to provide a method and system to attract a bird's attention to a structure which the bird could strike during flight, thereby providing the bird the opportunity to avoid the structure. This has the benefits of reducing injury and mortality to birds, while reducing stress for humans and reducing economic impact associated with bird strikes.

Other objects and advantages of the present invention will become more obvious hereinafter in the specification and drawings.

BRIEF DESCRIPTION OF THE DRAWINGS

Other objects, features, and advantages of the present invention will become apparent upon reference to the following description of the preferred embodiments and to the drawings, wherein corresponding reference characters indicate corresponding parts throughout the several views of the drawings and wherein:

FIGS. 4A, 4B, 4C, and 4D are schematic views of arrangements of one or more speakers for creating auditory and visual warning cues within a warning zone proximate to a structure in accordance with various embodiments of the present invention;

DETAILED DESCRIPTION OF THE INVENTION

Figure 1:
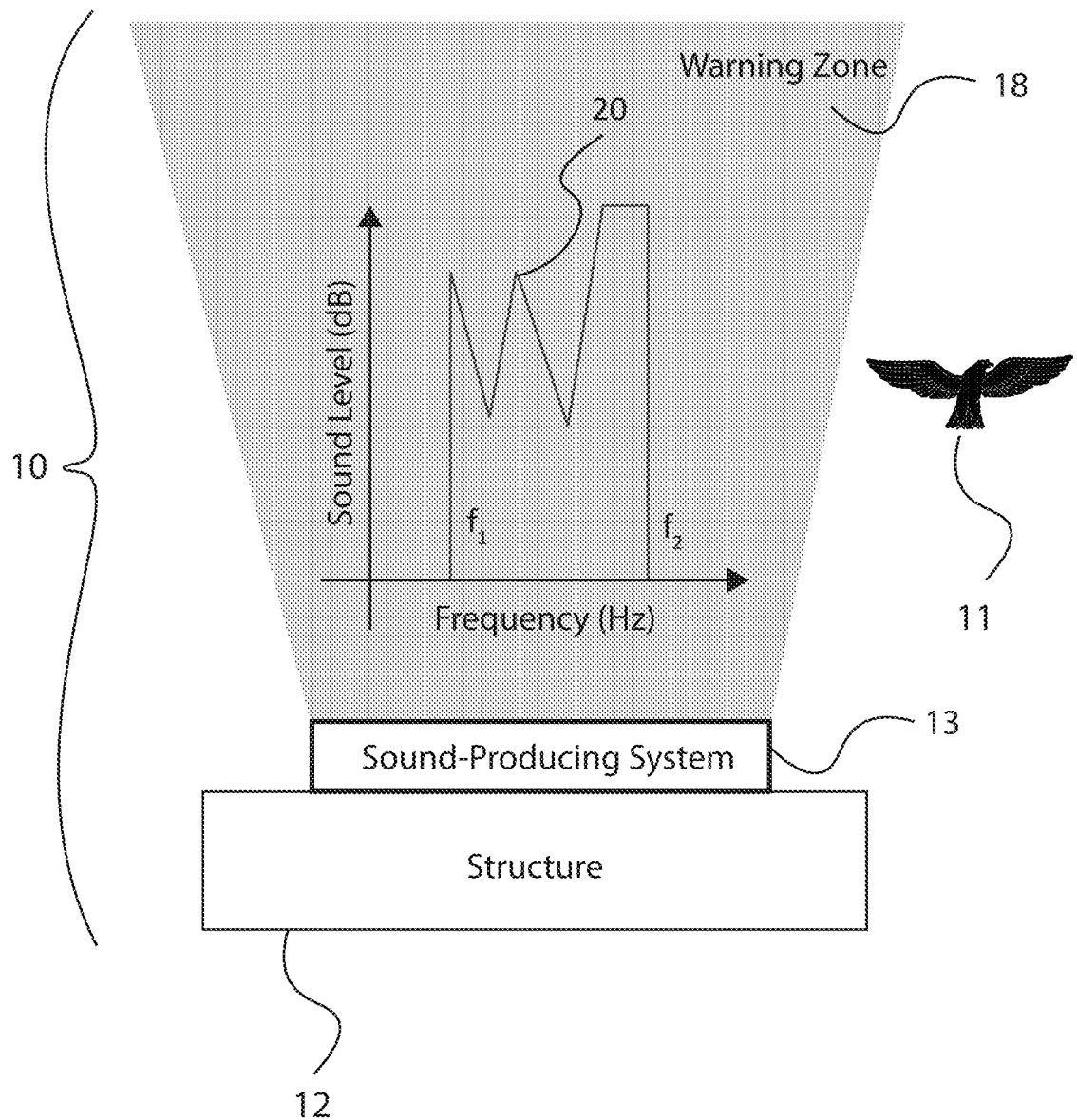
FIG. 1 is a schematic view of a system for reducing collisions between a bird and a structure in accordance with an embodiment of the present invention.
Figure 2A:
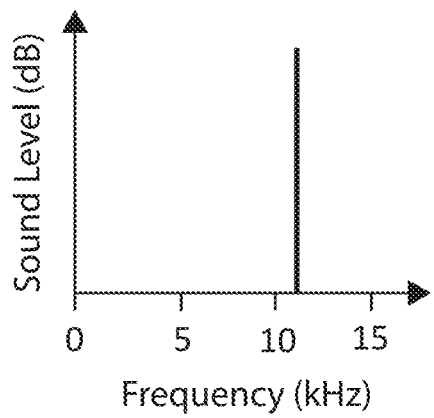
FIGS. 2A, 2B, 2C, 2D, 2E, and 2F show graphs of representative sound waveforms suitable for providing an auditory warning cue in accordance with various embodiments of the invention.
Figure 2B:
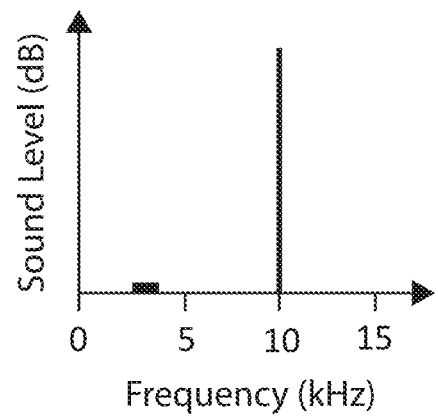
Figure 2C:
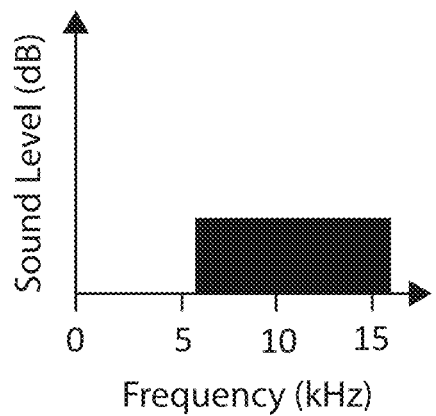
Figure 2D:
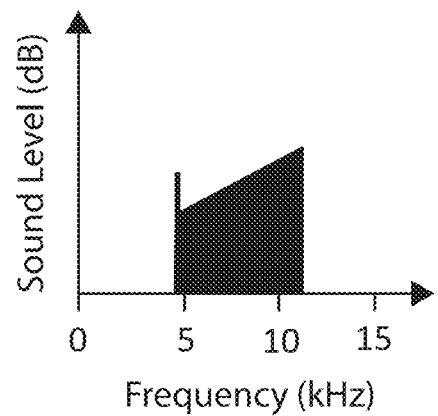
Figure 2E:
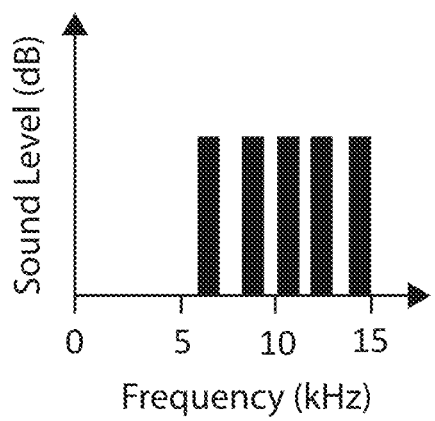
Figure 2F:
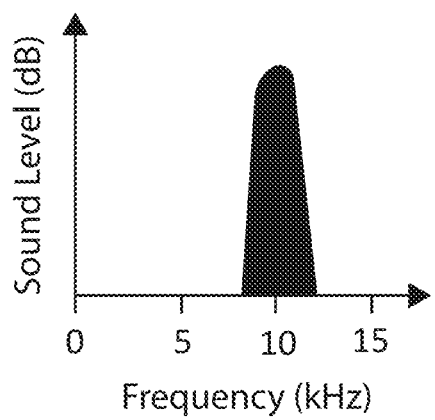

Referring now to the drawings and more particularly to FIG. 1, system 10 is provided for attracting the attention of a bird 11 and diverting it from a structure 12. Accordingly, system 10 provides the means to greatly reduce bird strike on a structure 12; specifically, by presenting a visual cue of the structure 12 paired with a sonic cue 20 produced by sound-producing system 13 and projected into warning zone 18.

A sound-producing system 13 includes one or more sound producers capable of introducing a high-frequency sound 20 into a warning zone 18. The sound can be introduced using directional and/or non-directional sources without departing from the scope of the present invention. The sound 20 introduced by sound-producing system 13 can be a single frequency or a waveform with amplitudes across many frequencies. The waveform can persist indefinitely, or it can be varied, included repeating patterns. It can turn on and off.

However, in order for the desired benefits to be achieved, when a bird is in the warning zone 18, a high-frequency sound is emitted from sound-producing system 12 with a decibel level of at least 80 dB at the source (and typically higher, for example 85 dB, or 90 dB, or 95 dB, or 100 dB, or 110 dB, or 120 dB, or 130 dB, or 140 dB) to provide sound intensity of at least 70 dB throughout the warning zone, wherein the high-frequency sound has a peak frequency between 6 kHz and 18 KHz.

Representative waveforms 20 are shown in FIG. 2. These waveforms 20 are used for purpose of description only and are not limitations of the present invention. A suitable high-frequency sound does not preclude some sound amplitude at lower frequencies than 6 kHz, or at higher frequencies than 18 kHz. Instead, the peak frequency must be between 6 kHz and 18 KHz, or 8 kHz and 18 kHz, or 6 kHz and 14 kHz, or 8 kHz and 14 kHz, or ranges incorporating any of the foregoing values.

Returning to FIG. 1, by introducing waveform 20 with suitable attributes into warning zone 18, the attention of an incoming bird is more likely to be attracted when paired with the visual cue of structure 12, thereby increasing the likelihood that a bird 11 takes evasive action to avoid a collision with structure 12.

More specifically, by introducing at least two separate waveforms 20 with suitable attributes into warning zone 18 within one second, the attention of an incoming bird is more likely to be attracted when paired with the visual cue of structure 12, thereby increasing the likelihood that a bird 11 takes evasive action to avoid a collision with structure 12.

In some embodiments, by introducing at least two separate waveforms 20 with suitable attributes into warning zone 18 within one second, wherein at least two of said separate waveforms have unequal temporal periodicities, the attention of an incoming bird is more likely to be attracted when paired with the visual cue of structure 12, thereby increasing the likelihood that a bird 11 takes evasive action to avoid a collision with structure 12.

The temporal periodicity for a given waveform (wherein the waveform is also referred to as a sonic pulse when the waveform has a temporal end), is defined as the amount of time between a given sonic pulse and both the previous sonic pulse and the following sonic pulse. For example, a repeating pattern wherein a waveform having a duration of one second is provided, followed by four seconds of silence, repeated indefinitely, would provide sonic pulses having four seconds before and after each pulse. Each pulse would have equal temporal periodicity, since the spacing between all pulses is the same.

As another example, a 10 microsecond sonic pulse presented at consistent intervals five times per second would not have sonic pulses with unequal temporal periodicities; i.e., each sonic pulse would have equal temporal periodicity.

In contrast, a repeated pattern of two 10 microsecond sonic pulses presented 0.2 seconds apart, followed by 0.6 seconds of silence, would provide sonic pulses having differing temporal periodicities, or unequal temporal periodicities; i.e., there is a 0.6 second interval prior to the first sonic pulse followed by a 0.2 second interval after the first sonic pulse, while there is a 0.2 second interval prior to the second sonic pulse and a 0.6 second interval after the second sonic pulse. It does not matter if the total sum of intervals is the same. As long as the before and after intervals for each sonic pulse are not identical, then the sonic pulses have unequal temporal periodicities.

As another example, consider a repeating pattern of four sonic pulses of waveform 2F in FIG. 2, all 0.1 second in duration, all provided 0.05 seconds apart, followed by 0.5 seconds of silence. While the second and third sonic pulses would have equal temporal periodicities, they would differ from the temporal periodicities of the first and fourth sonic pulses, which would differ from each other.

In some embodiments, a preferred auditory warning cue comprises at least two sonic pulses within one second, of the specified intensity and frequency, wherein said at least two sonic pulses have unequal temporal periodicities. This auditory warning cue is more likely to alert birds and prompt them to become more aware of their surroundings than an auditory cue that is constant, or one that contains a simple repeating pattern. In the latter case, a bird entering the warning zone could start hearing the constant pattern at a low decibel level outside the warning zone and could become temporarily habituated by the time the bird reaches the warning zone, and thus would be less likely to be alerted or warned as the noise intensity increases.

Given the speed at which birds fly, it is important to provide a suitable auditory warning cue at least once per second to provide a bird adequate time to alter its flight pattern to avoid a collision.

The waveforms used to provide the auditory warning can vary. For example, a repeating pattern of waveforms 2E and 2F in FIG. 2 could be used. Moreover, silence is not required between the sonic pulses. The waveform 2F could gradually change into 2A, with the official end of the sonic pulse provided by 2F occurring when the sound level dropped by 10 dB, or when the peak frequency changed by 500 Hz.

The sound in warning zone 18 must be sufficiently loud to attract the bird's attention, and yet, it is desirable that the noise should not have a deleterious impact on human activities. Accordingly, it can be advantageous to use directional sources of sound such that the warning zone 18 does not overlap with an area often frequented by humans. This is particularly important when the system is used in residential areas. In some cases, in can be advantageous to use auditory warning cues at the higher end of the specified frequency range, e.g., with peak frequencies greater than 15 kHz, where many humans have limited hearing.

The warning zone 18 can be any region on the ground, in the air, on the ground and in the air, in the water, etc. For example, warning zone 18 could be air space in advance of a vehicle or turbine, ground regions and associated air space next to windows, or any other area proximate to a structure upon which one wishes to avoid bird strikes.

Figure 3:
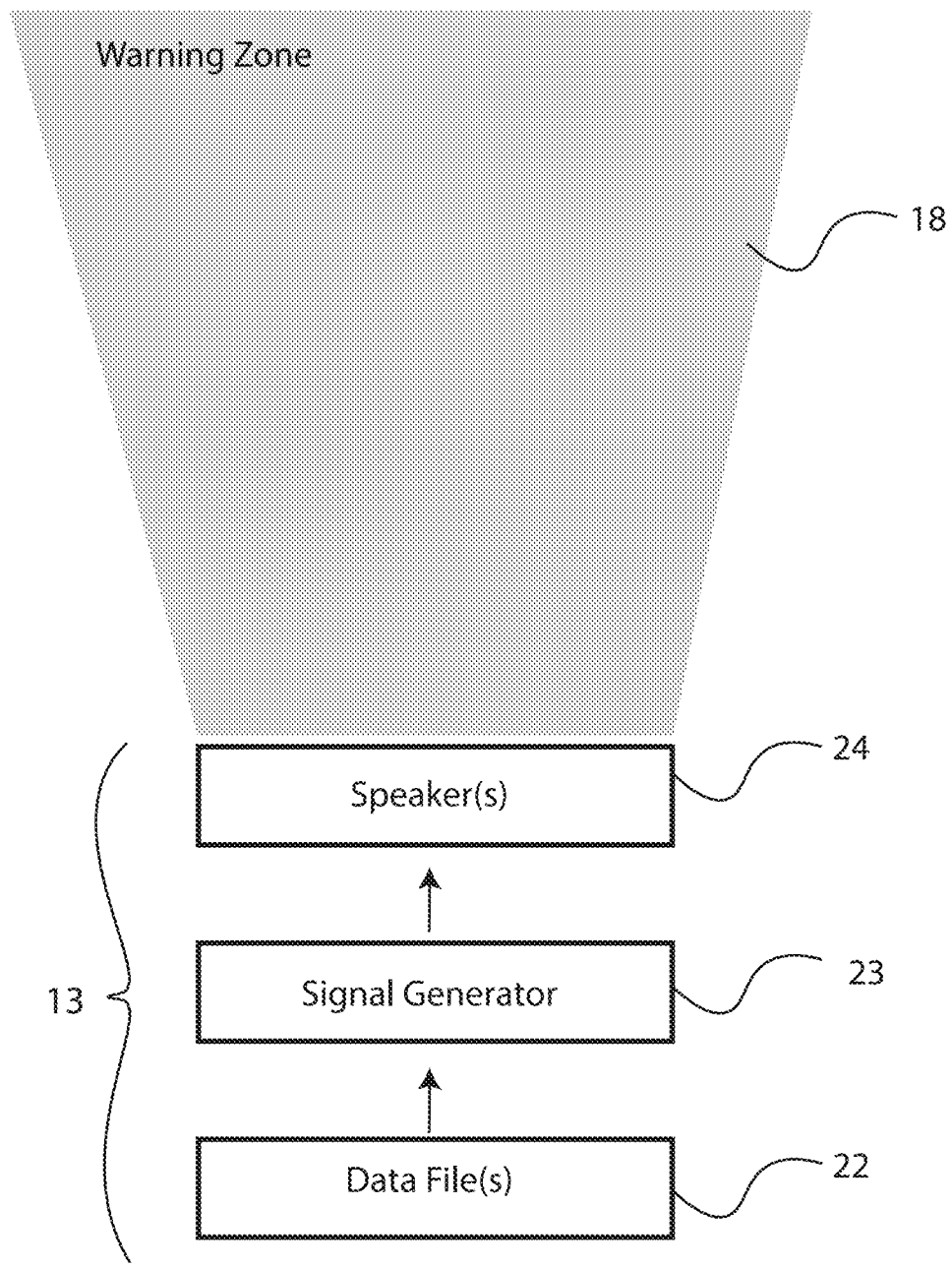
FIG. 3 is a schematic view of a system for generating a suitable auditory warning cue in a warning zone in accordance with an embodiment of the present.

Sound-producing device and system 13 comprises one or more sound producers capable of introducing sound into warning zone 18 that will provide a suitable auditory warning cue as described herein. Referring now to FIG. 3, sound-producing system 13 can include one or more data files 22, a signal generator 23, and one or more speakers 24. Data file 22 is analog or digital data that is indicative of one or more waveforms that are a function of frequency. Data file 22 can be provided on a variety of fixed or portable media (e.g., hard drive, solid-state memory, flash drive, CD, etc.), could be transmitted from a remote location (e.g., via hardwire or wireless communication), or otherwise made available without departing from the scope of the present invention. Signal generator 23 is any device capable of processing data file 22 to output one or more data-indicative waveforms to the one or more speakers 24, which project a waveform into said warning zone 18.

In one embodiment, parametric speaker arrays can be used to provide directional sound. As is known in the art, parametric speaker arrays are devices that combine two ultrasonic outputs to produce highly-directed and constrained beams of sound such that the sound is not audible outside the beam's extent. Briefly, parametric speaker arrays work by emitting ultrasound waves that transition to lower frequencies because of nonlinear and absorption effects as the waves propagate. The nonlinear effects provide for the creation of a narrow sound beam whose acoustic energy can be delivered over large distances without being heard outside of the beam. Parametric speaker arrays have a broad frequency band that allows the initially-introduced waveform to contain a range of frequencies. In carrying out the methods of the present invention, the two ultrasonic outputs can be emitted from the same device or two separate devices without departing from the scope of the present invention.

On a more detailed level, a parametric speaker array is a large transducer or an array of transducers that simultaneously emit two high-power high-frequency ultrasound waves. The superposition of two frequencies causes the waveform to be amplitude-modulated at the difference of the two original frequencies. As the waves propagate away from the parametric speaker array, they begin to transform because of the nonlinearity of the air. When two high-powered ultrasonic beams are present, a nonlinear phenomenon called demodulation occurs. This creates sum and difference frequency components at the sum and difference frequencies of the two original frequencies. The difference frequency will stay confined to the narrow beam creating a highly-directional beam.

The present invention can be implemented in a variety of ways depending on the type, size, and/or shape of the warning zone into which sound is to be introduced. For example, one or more directional or non-directional speakers can be used in a variety of arrangements/placements to satisfy the needs of many applications. Several non-limiting examples of such arrangement/placements will be described with the aid of FIG. 4. For clarity of illustration, the electronics used to excite the speaker arrays have been omitted.

FIG. 4A illustrates a conventional speaker 24 attached to a structure 12, broadcasting auditory warning cues in a non-directional manner into warning zone 18.

FIG. 4B illustrates another embodiment of the present invention wherein a directional speaker 24, or a combination of directional speakers 24 including a parametric array, is attached to a structure 12 and produces auditory warning cues in a warning zone 18. The warning zone is depicted here in the schematic view as a two-dimensional rectangle, but it is understood to be a three-dimensional warning zone, and can take any shape, include, for example, a conical beam.

In still another embodiment of the present invention, FIG. 4C illustrates a directional speaker 24 that is not attached to a structure 12, broadcasting auditory warning cues in a directional manner into warning zone 18. FIG. 4D shows another embodiment of the invention in which a combination of directional speakers 24, not attached to structure 12, produces waveforms into warning zone 18 in accordance with the present invention.

Note that speakers can be placed at independent locations relative to the structure, at varying heights, and can be oriented in any fashion.

For example, in one embodiment, directional speakers are deployed at ground level and direct sound output in a mostly vertical direction to produce warning zones all around a wind turbine.

In another illustrative embodiment, non-directional speakers are attached at various heights to a communications tower to create a warning zone in its vicinity.

In another illustrative embodiment, speakers are attached to a rotating wind turbine. Other mobile platforms for carrying the speakers include but are not limited to cars, trucks, unmanned aerial vehicles, and airplanes.

In some embodiments, parametric speaker arrays are utilized. Parametric speaker arrays can be a single device excited with signals $S_1$ and $S_2$ to produce two ultrasonic frequency waves $W_1$ and $W_2$, respectively, which combine to create/produce a lower-frequency sound beam. Multiple devices can also be used wherein one device is excited with signal $S_1$ and the other is excited by signal $S_2$. The parametric speaker arrays could also be excited by multiple pairs of signals to control the range extent of sound propagation.

In all embodiments, a visual warning cue is paired with an auditory warning cue. The visual warning cue can simply entail a direct line of sight to the structure upon which one wishes to minimize bird strikes, or the structure can be modified to provide enhanced warning through use of conspicuous lights, colors, patterns, etc. For example, blue-spectrum lights, or UV-reflective tape, can amplify the visual warning cue when integrated into the structure, for example, by attaching them to the structure.

The auditory warning cue must be sufficiently loud, and of an unusual frequency, such that it attracts the attention of a bird. More specifically, the desired auditory cue is in the sound range 6 kHz to 18 KHz, or 8 kHz to 14 kHz, or 15 kHz to 18 kHz, or ranges incorporating any of the foregoing values. Typical background noise occurs at a frequency below 6 kHz, and sounds of a higher frequency are thus more likely to be unusual and therefore capture the attention of a bird.

The intensity of the auditory warning cue must be at least 70 dB in order to provide the benefits of the claimed invention. Moreover, an auditory warning cue must be projected often in order to be effective and to provide sufficient warning to birds.

The auditory warning cue can be consistent throughout the warning zone, or it can vary. For example, an incoming bird can experience increasing intensity of sound as it nears the structure, or, for example, additional frequencies or an alteration of temporal periodicity might be projected in some regions of the warning zone.

In other embodiments, a bird detection unit (e.g., a radar detection unit, or infrared imaging system) is utilized to detect when a bird is in or nearby to the warning zone. A signal is communicated from the bird detection unit to the sound-producing system, and then the sound-producing system begins to produce sounds in accordance with the methods of the invention. When the bird detection unit indicates that a bird is no longer in or near the target zone, the auditory warning cue is turned off.

In order to provide sufficient warning, given the speed of bird flight, the warning zone must be at least ten (10) cubic meters in volume; anything smaller would be too small to give the birds sufficient time to adequately adjust their flight and provide the substantial reduction in bird strikes provided by the systems and methods described herein. In many embodiments, the warning zone will be much larger (e.g., greater than 100 cubic meters, or greater than 500 cubic meters, or greater than 1,000 cubic meters, or greater than 10,000 cubic meters). The maximum length of the warning zone in any one direction from the closest location on a selected structure is 100 meters.

At any point within the warning zone, there must be a direct line of sight to the structure of interest. Note that the warning zone can take any shape, and can contain islands within the warning zone that are not part of the warning zone; for example, because the direct line of sight to the structure is absent at that particular location.

In preferred embodiments, there is no effect or only moderate effect on humans in the vicinity of the warning zone. Directional speakers are particularly well-adapted to reduce impact on humans and other non-bird species.

EXAMPLES

The examples that follow are intended in no way to limit the scope of this invention but are provided to illustrate the methods of the present invention. Many other embodiments of this invention will be apparent to one skilled in the art.

Example 1

We investigated whether an obviously audible sound projected in front of a potential strike surface altered the flight of birds to reduce the risks and damage of bird-strike. To address this goal, we trained captive zebra finches (*Taeniopygia guttata*) to fly down a flight corridor and through an empty wooden frame. Once birds were trained, we introduced three experimental treatments at unpredictable times between continuous training flights: (1) a loud sound field in front of the empty wooden frame; (2) a mist net in the wooden frame (i.e., a benign strike surface) but no sound field; and (3) both the loud sound field and the mist net. Using high-speed digital videography, we quantified flight velocity and flight posture of birds. We hypothesized that the addition of the sound field in front of the mist net would alter flight behavior.

Specifically, we predicted that birds would fly more slowly and increase the angle of attack of their bodies and tail, resulting in a more vertical (compared with horizontal) flight posture that would allow for slower flight.

Methods. We quantified flight behavior of 18 adult domestic zebra finches (8 males, 10 females), which we designated as experimental birds. These birds were housed in an indoor environmentally-controlled free-flight room (approximately 3×3×2 m) on a 14:10 L:D photoperiod with ad libitum access to food, grit, and drinking and bathing water. The room contained two open-sided cardboard boxes (approximately 0.4×0.25×0.25 m) that contained their perches, food, and grit. Both boxes were adorned with orange flagging tape to make them visually conspicuous and were positioned 0.9 m from the ground in the diagonally-opposite corners of the room to encourage flight between the open-sided boxes. Birds had to visit these boxes many times each day to feed and to roost. We placed a small housing cage (approximately 0.25×0.2×0.4 m) directly behind one of the open-sided cardboard boxes so that it was visible to birds in the box. We placed the open-sided boxes and the small housing cage in the birds' free-flight room as identical boxes and cage were used in the experimental flight corridor and the birds' pre-exposure to these objects assisted with flight training.

We housed three additional adult domestic zebra finches (1 male, 2 females) in a wire cage (approximately 0.6×0.4× 0.4 m) in the same general environmental conditions as the experimental birds, but in a separate room. These birds were designated as "stimulus" birds and used as an attractant for the experimental birds during flight trials.

Figure 5:
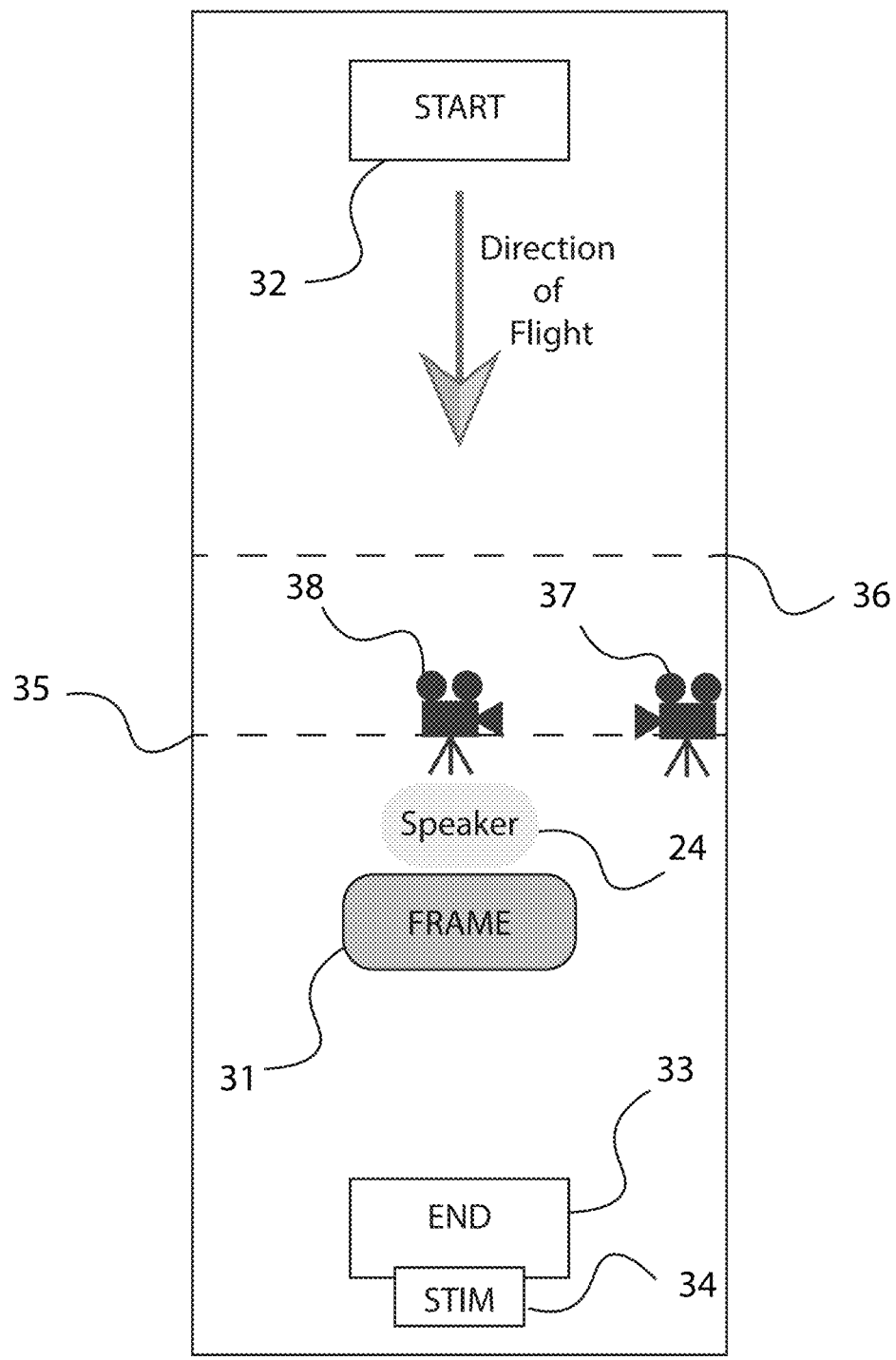
FIG. 5 is a schematic view of an experimental flight corridor in accordance with another embodiment of the present invention.

Our experimental arena was an outdoor, wire-mesh flight corridor (approximately 8.5×2.5×2.2 m), shown schematically in FIG. 5. It had a translucent, corrugated plastic roof. We lined most walls with thin plastic sheeting to control lighting and to insulate the corridor when flights were performed during colder weather. We placed a floor-to-ceiling open wooden frame 31 (1 m wide, 2.2 m tall) at 6 m along the corridor. In some experimental trials, a mist net was placed within this frame, otherwise it was open so that birds were trained to fly through it. A highly directional speaker 24 (Holosonics Audio Spotlight 168i) was placed flat on the corridor floor 0.5 m in front of the wooden frame and facing directly upward such that when a sound was played through the speaker, a column of noise was projected directly in front of the frame. To minimize the scattering of sound waves from the speaker we affixed sound-absorbing foam to the walls, floor, and ceiling in this area. We confirmed that the speaker and foam arrangement produced a reasonably discrete column of sound directly in front of the wooden frame by collecting sound pressure level (dBA) readings with a handheld meter.

We placed an orange-flagged open-sided cardboard box, identical to those in the housing room, at both ends of the flight corridor. We designated the box furthest from the wooden frame as the "start box" 32 and this was where all birds were released from. The box at the opposite end of the corridor was the "end box" 33. We placed the three stimulus birds in a small wire cage 34 (approximately 0.25×0.2×0.4 m) directly behind the open-sided end box so that they were visible to birds flying down the corridor. In order to help gauge distances from the wooden frame, we marked the floor, ceiling, and wall of the flight corridor with high-contrast taped lines 35 and 36 that demarked distances of 1 m and 2 m in front of the wooden frame.

To record birds' flight, we used two GoPro Hero4 Black high-speed digital video cameras 37 and 38, recording at 120 frames per second. One camera was placed perpendicular to the length of the flight corridor. The other camera was affixed to the ceiling and recorded directly downward (except for the first five trials were it was mounted on the floor and pointed up) and was aligned in the same axis as the length of the corridor. We carefully aligned both cameras so they could be combined to estimate three-dimensional movements of the birds in flight. We also calibrated each camera before every bout of flight trials with standardized grid images (with 0.1×0.1 m cells) so that we could assess birds' flight in all three planes of movement. Though the cameras were not explicitly synchronized, we used the occasions when birds crossed the 1 m and 2 m markings on the corridor's walls and floor to help synchronize frames of videos from the two cameras for a single flight trial. We recognize that this methodology introduces some random noise to our flight reconstructions but it does not bias our data toward supporting particular hypotheses.

Before commencing flight trials, we confirmed that the speaker produced the intended sound field. We used a handheld sound pressure level meter (Extech 407730, using A-weighting) to record sound pressure at points that were 0.4 m apart in a three-dimensional grid, starting at the floor of the corridor and moving in all directions to sample the entire space that birds could fly through. This procedure ensured that there was a column of noise at approximately 82 dBA SPL directly above the speaker and that the noise fell away to close to background levels within 1 m in all directions. Hence, as birds flew toward the wooden frame, the birds experienced a loud sound field starting approximately 1 to 1.5 m in front of the frame and this sound field persisted slightly through the frame.

Experimental birds were subjected to flight training in the experimental corridor. A flight training trial began when an experimenter released a pair of birds from the start box with the simultaneous sounding of a startle stimulus (sports whistle). The goal of the training was for birds to fly directly from the start box to the end box and pass through the wooden frame. For the following 120 minutes of the trial, the experimenter walked the length of the corridor, encouraging both birds to fly directly between the start and end boxes, through the wooden frame, in both directions up and down the corridor. When a bird made a complete flight from one end of the aviary to the other, the bird was given 3-5 mins rest so that it did not become overtly fatigued.

During these initial bidirectional training trials, we recorded whether each bird flew through the wooden frame. Once a bird flew from one box to the other and directly through the wooden frame in more than 65% of all flights within a bidirectional learning trial, it progressed to the next series of learning trials (unidirectional). We often paired slower learners with a tutor bird who had already learned the flight task. This appeared to accelerate learning. On average, each bird made 12.8 (SE=1.0) complete flights from one box to the other during a bidirectional flight-learning trial. Birds experienced an average of 8.9 (SE=1.07) bidirectional flight-training trials before passing the learning criterion.

Once a bird succeeded at the bidirectional trials, the bird was subjected to individual (i.e., without a partner) unidirectional flight-training trials. The goal of these trials was to ensure that a single bird could be released (from inside a standardized cardboard tube, 8 cm diameter) from the start box and fly directly to the end box, through the wooden frame. Upon release, an experimenter sounded the startle stimulus, as before. Following a single flight, the experimental bird was caught with a hand-net before being released for a further training flight. We recorded whether or not each bird flew through the wooden frame during these trials. All experimental birds experienced one unidirectional training trial, which comprised an average of 3.7 separate flights (SE=0.3). Once a bird flew through the center of the empty wooden frame on three consecutive (or three out of four) unidirectional flights, it was considered to have passed unidirectional flight training and progressed to the experimental flight trials.

Experimental flight trials. To start an experimental flight trial, each bird individually experienced a maximum of six unidirectional flights (as described above). Once a bird flew through the wooden frame in three consecutive flights (out of six possible), it then experienced a further 1 to 4 (randomly determined) unidirectional flights immediately followed by an experimental treatment. If it did not reach the initial criterion (i.e., three consecutive flights through the wooden frame), the bird returned to unidirectional flight training. This sequence of unidirectional flights allowed us to ensure that the bird was still flying from the start to the end box through the wooden frame, and was presented with an experimental treatment on an unpredictable occasion.

There were three experimental treatments: (i) Sound, wherein the speaker in front of the empty wooden frame emitted a 2-10 kHz sound (with peak intensity at 8.5 kHz) at approximately 82 dBA SPL at one meter above the speaker; (ii) MistNet, where the speaker was turned off and a soft but taut mist net was placed inside the wooden frame to act as a benign strike surface; and (iii) Both, where both the speaker was turned on and the mist net was placed in the frame. A bird could experience one treatment only for each day's experimental flight trial. The ordering of presentation of treatments was balanced so that across the 18 subjects there was no order bias for any experimental treatment.

Immediately following an experimental treatment flight, each bird experienced a maximum of six further unidirectional flights or until the bird flew through the wooden frame on three consecutive flights, whichever occurred first. This procedure helped to reinforce that birds needed to fly from the start to the end box and through the wooden frame. Birds experienced all of their flights within a trial in sequence without interruption. Each bird had at least one day off from any flight trials following an experimental trial.

We extracted videos from the cameras and analyzed flight videos for all experimental flights and for the unidirectional flight that immediately preceded each experimental trial. This unidirectional flight served as a reference flight that accounted for variation in individual flight behavior that was not explained by treatment effects. For each video, we extracted single frames using Virtual Dub software as high-resolution JPG files. We started frame extraction when the bird first reached the line 36 on the aviary floor/wall that was 2 m in front of the wooden frame 31 (FIG. 5), and extracted the proceeding 30 frames. This time period allowed every bird to pass the speaker and potentially make contact with the mist net or pass through the frame. We imported these frames into ImageJ (National Institutes for Health). In ImageJ, we calibrated each day's frames to the measured distances recorded on the calibration grids, which were placed at distances from the camera that were typical of where birds flew in the corridor. This procedure allowed us to generate coordinates in horizontal (x) and vertical (y) planes from the camera 37 that recorded from the side and from the lateral (z) plane from the camera 38 that recorded from the ceiling (or the floor). The two cameras were approximately synchronized as the first frame was always when the bird crossed the 2 m line.

For each bird's side-on video, we digitized the following points on the body to generate x- and y-plane coordinates: the distal tip of the bill (bill), the middle point of a line that bisected the body in a dorsal-ventral direction immediately behind the wing (body), and the distal tip of the center of the tail (tail). For each ceiling/floor video, we digitized the distal tip of the bill (bill) only to generate a z-plane coordinate. These coordinates allowed us to measure flight velocity, angle of attack of the body, and angle of attack of the tail. We averaged velocity and angle measurements for every group of 5 frames (i.e., t1=frames 1 to 5, t2=frames 6 to 10, t3=frames 11 to 15, t4=frames 16 to 20, t5=frames 21 to 25, t6=frames 26 to 30) to help minimize digitization error and still give a time sequence of flight metrics for each video. All videos were digitized and analyzed blind to treatment group.

Statistical analyses. We calculated three change variables (for velocity, body angle, and tail angle) by subtracting performance in the reference flight (the unidirectional flight immediately preceding an experimental treatment flight) from performance in each treatment flight (Sound, MistNet, Both), for each bird. A negative value in the velocity-change statistic meant a bird flew slower in the treatment relative to the most recent reference flight. A positive value in any angle of attack change statistic indicated a larger angle of attack in the treatment flights relative to the reference flight.

We used a repeated-measures ANOVA to test our hypotheses, by comparing the differences in the change variables (velocity, body angle, tail angle, in separate models) among treatments within each bird, across all time periods (t1 through t6). Treatment group (Sound, MistNet, Both) and time period (1-6) were both treated as within-subject fixed factors. We also inspected two a priori contrasts: Sound vs MistNet, which helped us to interpret whether the presence of a sound field elicited a similar response as to the presence of a barrier (i.e., mist net); and MistNet vs Both, which helped us understand whether the addition of a sound field in front of a strike surface altered flight behavior further. We interpreted effect sizes (partial eta-squared) of these tests along with visual inspection of estimated marginal means and associated confidence intervals. All analyses were performed with IBM SPSS Statistics v23 employing two-tailed tests of probability.

Results. Two birds were removed from the analyses as they deviated sufficiently from a central flight path during their Both experimental flight such that we could not adequately digitize their movements.

Figure 6:
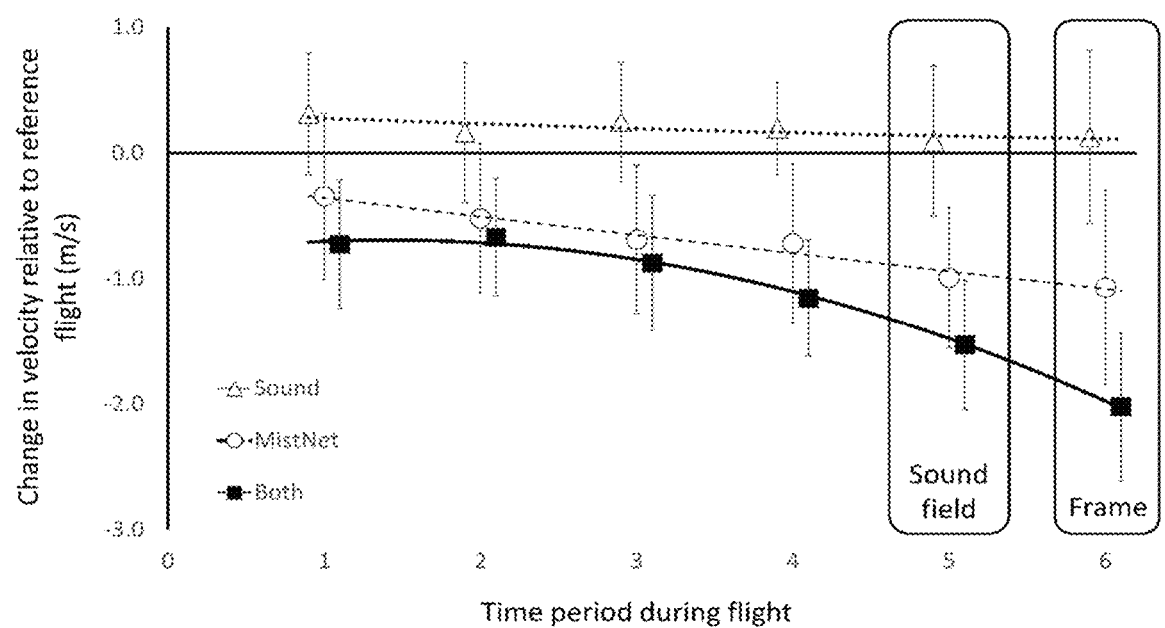
FIG. 6 is a graph showing the change in velocity of birds during flight when presented with a visual warning cue ("MistNet"), an auditory warning cue ("Sound"), or a combination thereof ("Both")

Within-individual change in flight velocity (relative to the most recent reference flight for each bird) differed by experimental treatment group ($F_{2,30}=10.16$, $P<0.0005$, effect size=0.404) and over the time sequence as birds approached the wooden frame ($F_{5,75}=11.84$, $P<0.0001$, effect size=0.441). In addition, there was a treatment-by-time interaction, indicating that the pattern of how velocity changed over time was different among the treatment groups ($F_{10,150}=2.75$, $P=0.004$, effect size=0.155). Inspection of a priori contrast indicated that the Sound treatment differed from the MistNet treatment (F1,15=8.17, P=0.012, effect size=0.353) and the Both treatment differed from the MistNet treatment (F1,15=12.53, P=0.003, effect size=0.455). By visual inspection of estimated marginal means and associated confidence intervals, we could see that the Sound treatment generally had little effect on flight velocity, whereas velocity decreased in the MistNet and Both treatments as birds approached the wooden frame (FIG. 6). In addition, the Both treatment resulted in a much larger (approximately twice as much) deceleration of flight than did the MistNet treatment. Hence, it would appear that the sound field alone is not perceived as a barrier in the same manner as a mist net. However, the addition of a sound field in front of a mist net notably reduces flight velocity close to the time of contact with the barrier (i.e., at t6).

Figure 7:
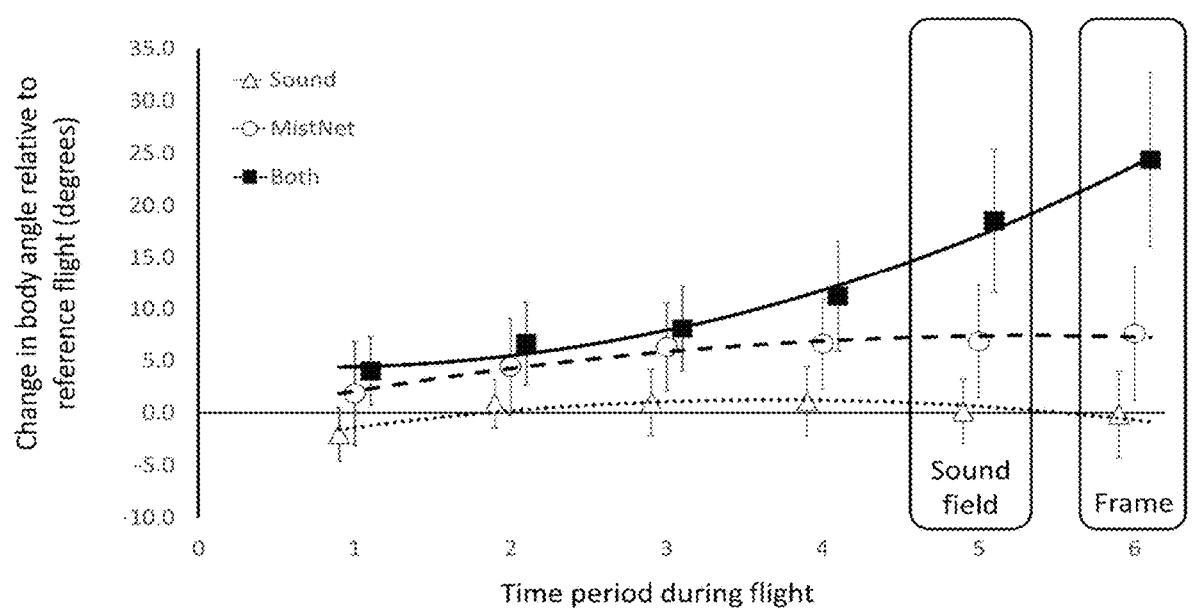
FIG. 7 is a graph showing the change in the body angle of birds during flight when presented with a visual warning cue, an auditory warning cue, or a combination thereof.

The experimental treatments had a notable effect on body angle of attack (F2,30=16.71, P<0.00002, effect size=0.527) and an even larger effect on tail angle of attack (F2, 30=24.72, P<0.00001, effect size=0.622). Both body angles (FIG. 7) and tail angles changed during the flights, getting larger as the birds approached the wooden frame (body angle, F5,75=12.65, P<0.00001, effect size=0.458; tail angle, F5,75=16.36, P<0.00001, effect size=0.522). As with the velocity analysis, there was a notable treatment-by-time interaction effect, indicating that the way in which body and tail angles changed over time was different among the treatment groups (body angle, F10,150=6.00, P<0.00001, effect size=0.286; tail angle, F10,150=7.81, P<0.00001, effect size=0.342).

The a priori contrasts indicated that body angle (FIG. 7) differed somewhat between Sound and MistNet treatments (F1,15=7.09, P=0.018, effect size=0.321) and differed substantially between MistNet and Both treatment groups (F1, 15=25.86, P=0.0001, effect size=0.633). By examining the confidence intervals around these patterns, we can see that birds did not substantially alter their body angle of attack in the presence of the mist net alone or with the sound field alone. However, if a sound field was in front of the mist net then birds made large changes to their body posture, increasing their angle of attack to be more vertical as they approached the wooden frame.

Figure 8:
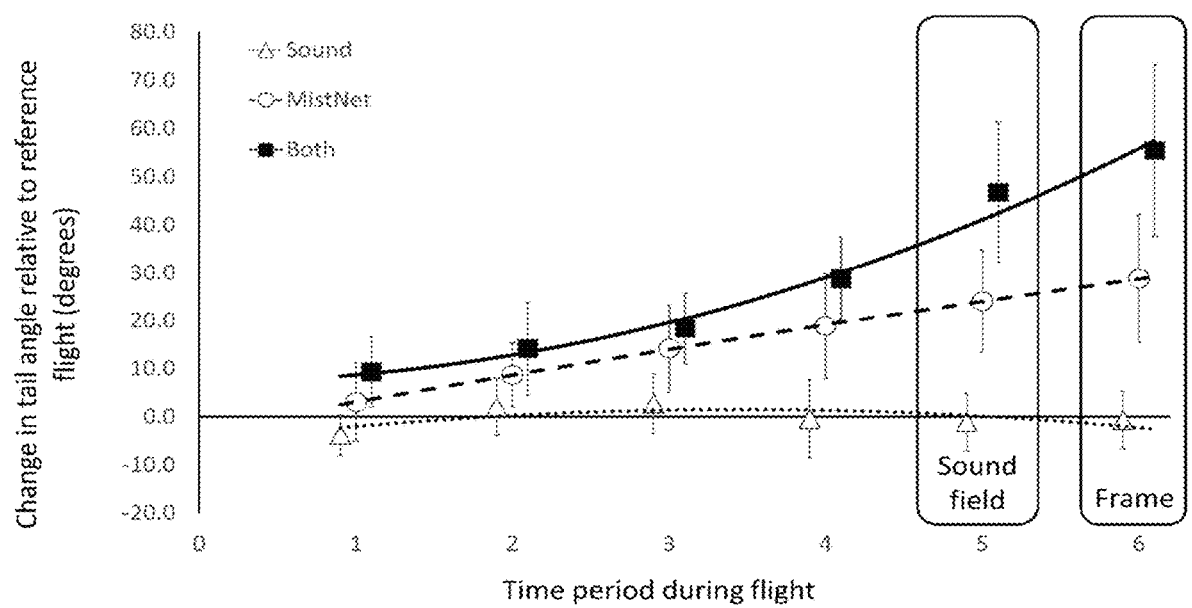
FIG. 8 is a graph showing the change in the tail angle of birds during flight when presented with a visual warning cue, an auditory warning cue, or a combination thereof.

There were stronger differences in tail angle of attack among treatment groups (FIG. 8). The MistNet treatment elicited a larger tail angle of attack than the Sound treatment (F1,15=19.38, P=0.001, effect size=0.564). In addition, the Both treatment elicited an even larger increase in tail angle of attack than the MistNet treatment (F1,15=28.42, P=0.00008, effect size=0.654). These data are consistent with the flight velocity analyses in that the an increased angle of attack of the tail, lowering of the distal tip of the tail relative to the body, was associated with slower flight velocity.

Our results indicate that in the presence of a visible strike surface, an intensely audible sound field caused birds to slow down their flight and alter their body and tail position away from a horizontal flight posture. Specifically, birds reduced their flight velocity by approximately twice as much when the sound field was placed in front of a mist net, compared with their flight velocity when the sound field was not present. On average, birds flew at 4.82 m/s (SE=0.24) during reference flights, and slowed down by 2.02 m/s on average when exposed to the sound field in front of the mist net (Both treatment). When the mist net was present without the sound field (MistNet treatment), birds typically reduced their flight velocity by only 1.07 m/s. When presented with only the sound field and no visual cue, birds did not slow their flight.

Accordingly, the combination of the sonic cue and the visual cue was synergistic, with the combined effects much larger than the sum of the independent effects of the sonic cue and visual cue. This synergy was also apparent in changes in body angle and tail angle. Again, in both cases, the combination of the sonic cue and visual cue produced changes far greater than the additive changes produced by either cue alone.

EQUIVALENTS

While specific embodiments of the subject invention have been discussed, the above specification is illustrative and not restrictive. Many variations of the invention will become apparent to those skilled in the art upon review of this specification. The full scope of the invention should be determined by reference to the claims, along with their full scope of equivalents, and the specification, along with such variations.

The articles "a" and "an" are used herein to refer to one or to more than one (i.e. to at least one) of the grammatical object of the article. By way of example, "a speaker" means one speaker or more than one speaker.

Any ranges cited herein are inclusive, e.g., "between 6 kHz and 18 kHz" includes frequencies of 6 kHz and 18 kHz.

I claim:

1. A method of reducing bird strikes against a man-made structure comprising the step of introducing both an auditory warning cue and a visual warning cue into a defined warning zone, said auditory warning cue being produced by a sound-producing system and defined by a sound waveform having
    (i) a peak intensity of between 6 kHz and 18 kHz, and
    (ii) an intensity at a location within the warning zone of at least 70 decibels, and
    said visual warning cue defined by a clear line of sight from a bird within said warning zone to said man-made structure;
    wherein said auditory warning cue comprises at least two of said sound waveforms emitted by said sound-producing system within a time period of one second when said bird is within said warning zone,
    wherein said warning zone comprises a region larger than ten cubic meters and extends no further than 100 meters from said man-made structure,
    wherein said auditory warning cue comprises at least three of said sound waveforms emitted by said sound-producing system within a time period of one second when said bird is within said warning zone, and
    wherein the elapsed time between the start of the first sound waveform and the start of the second sound waveform of said at least three of said sound waveforms is different from the elapsed time between the start of the second sound waveform and the start of the third sound waveform of said at least three of said sound waveforms.

2. A system for reducing bird strikes against a man-made structure comprising at least one sound-producing device configured to introduce an auditory warning cue into a warning zone and at least one visual warning cue;
    said auditory warning cue comprising a sound waveform defined by
    (i) a peak frequency of between 6 kHz and 18 kHz, and
    (ii) an intensity at a location within the warning zone of at least 70 decibels,
    said visual warning cue defined by a clear line of sight from a bird within said warning zone to said man-made structure;

wherein said auditory warning cue comprises at least two of said sound waveforms emitted by said sound-producing system within a time period of one second when said bird is within said warning zone, wherein said warning zone comprises a region larger than ten cubic meters and extends no further than 100 meters from said man-made structure, wherein said auditory warning cue comprises at least three of said sound waveforms emitted by said sound-producing system within a time period of one second when said bird is within said warning zone, and wherein the elapsed time between the start of the first sound waveform and the start of the second sound waveform of said at least three of said sound waveforms is different from the elapsed time between the start of the second sound waveform and the start of the third sound waveform of said at least three of said sound waveforms.

\* \* \* \* \*